United States Patent [19]

Nagai et al.

[11] 4,182,821

[45] Jan. 8, 1980

[54] METHOD FOR PRODUCING A LEAD CONTAINING MONOMER COMPOSITION AND A RADIATION SHIELDING POLYMER

[75] Inventors: Haruo Nagai; Hiroshi Uehara, both of Nakajo; Kunikazu Nunokawa, Kurokawa, all of Japan

[73] Assignee: Kyowa Gas Chemical Industry Co., Ltd., Japan

[21] Appl. No.: 850,965

[22] Filed: Nov. 14, 1977

[30] Foreign Application Priority Data

Nov. 19, 1976 [JP] Japan ............................... 51-139130

[51] Int. Cl.[2] ................................................ C07F 7/24

[52] U.S. Cl. .................................... 526/240; 252/182; 260/435 R; 526/75; 526/192; 528/392

[58] Field of Search ......................... 526/240; 528/392; 252/182; 260/435 R

[56] References Cited

U.S. PATENT DOCUMENTS

| | | | |
|---|---|---|---|
| 2,383,647 | 8/1945 | Hauser | 260/435 R X |
| 3,291,818 | 12/1966 | Ratz et al. | 260/435 R |
| 3,562,180 | 2/1971 | White et al. | 252/182 X |
| 3,689,427 | 9/1972 | Matsuda et al. | 252/182 X |
| 3,755,264 | 8/1973 | Testa | 526/240 X |
| 3,803,267 | 4/1974 | Kuwahara et al. | 526/240 X |
| 4,022,960 | 5/1977 | Mima et al. | 526/240 |

*Primary Examiner*—Helen M. S. Sneed

*Attorney, Agent, or Firm*—Gordon W. Hueschen

[57] ABSTRACT

A method for producing a lead containing monomer composition comprising reacting a mixture comprising (1) at least one monomer selected from the group consisting of alkyl methacrylate having 1–4 carbon atoms in an alkyl group, hydroxyalkyl acrylate, hydroxyalkyl methacrylate and styrene, (2) acrylic or methacrylic acid, (3) an organic acid having the general formula: $R_1COOH$, wherein $R_1$ is hydrocarbon residue having 5–20 carbon atoms and optionally (4) an organic acid having the general formula: $R_2COOH$, wherein $R_2$ is hydrocarbon residue having 2–4 carbon atoms with lead monoxide. The composition is polymerized to obtain a radiation shielding polymer.

28 Claims, No Drawings

METHOD FOR PRODUCING A LEAD CONTAINING MONOMER COMPOSITION AND A RADIATION SHIELDING POLYMER

The present invention relates to a method for producing a lead containing monomer composition used for producing a radiation shielding material with an improved optical transparency and mechanical strength and a method for producing a polymer having a radiation shielding property.

It is known that a transparent radiation shielding material is obtainable from lead acrylate or lead methacrylate by polymerizing it at a temperature above the melting point thereof but the resulting material is very fragile and cannot be put to practical use in forming, fabrication and handling. While it is possible to improve the strength of such material by polymerizing lead acrylate or lead methacrylate in admixture with a copolymerizable monomer such as methyl methacrylate, the polymer thus prepared generally loses its transparency to exhibit an opaque or opaque white appearance in a composition comprising such a lead content as to satisfy to some extent both radiation shielding performance and mechanical strength. For instance, while lead methacrylate can be mixed at a temperature above its melting point with methyl methacrylate at any compounding ratio to form a uniform and transparent mixture, the ratio of lead methacrylate in the mixture capable of providing a transparent polymer upon polymerization is less than about 6% by weight, where practical radiation shielding performance is not attained, or more than about 95% by weight, where practical mechanical strength is lost.

It is, accordingly, an object of the present invention is to provide a method for producing a lead containing monomer composition giving a polymeric material having a radiation shielding property which is highly excellent both in optical transparency and in mechanical strength.

Another object of the present invention is to provide a method for producing a radiation shielding polymeric material which is highly excellent both in optical transparency and in mechanical strength.

The foregoing objects can be attained by a method for producing a lead containing monomer composition comprising reacting a mixture comprising (1) at least one monomer selected from the group consisting of alkyl methacrylate having 1–4 carbon atoms in an alkyl group, hydroxyalkyl acrylate, hydroxyalkyl methacrylate and styrene, (2) at least one monomer selected from the group consisting of acrylic acid and methacrylic acid, (3) at least one organic acid having the general formula $R_1COOH$, wherein $R_1$ is a saturated or unsaturated hydrocarbon residue which 4, non-substituted or substituted with a hydroxyl group and having 5–20 carbon atoms and optionally (4) an organic acid having the general formula $R_2COOH$ excluding acrylic and methacrylic acids, wherein $R_2$ is a saturated or unsaturated hydrocarbon residue having 2–4 carbon atoms with lead monoxide, wherein (i) an amount of lead monoxide to total weight of a raw material to be used is 6.5–57% by weight, (ii) a ratio of total moles of the organic acids to gram atoms of lead is at most 4, (iii) an amount of said monomer (2) to the raw material is 3–45% by weight, a total amount of said organic acid (3) and said organic acid (4) to the raw material is 1.1–60% by weight, and moles (A) of said monomer (2) and moles (B) of said organic acid (3) and said organic acid (4) to 100 g of the raw material satisfy anyone of the following formulas I and II:

$$B>0.3A-0.04 \quad (I)$$

$$B>-0.7A+0.36 \quad (II)$$

and (iv) an amount of said organic acid (4) to the total amount of both organic acid (3) and organic acid (4) is 0–50% by weight. Further a radiation shielding polymeric material which is highly excellent both in optical transparency and in mechanical strength can be obtained by polymerizing the monomer composition thus obtained.

It has not been anticipated so far that a material which is prepared by polymerizing the monomer composition obtained by inclusion of the above lead monoxide in a specified range to the above monomers can maintain a high transparency thereof as in the present invention. Although the above mechanism cannot wholly been explained theoretically at present, this is very important in industrial and medical points of view in that it provides a material of a practical radiation shielding performance excellent both in mechanical strength and in optical transparency.

Alkyl methacrylate as used herein includes those having 1–4 carbon atoms in an alkyl group such as methyl methacrylate, ethyl methacrylate, n-propyl methacrylate, isopropyl methacrylate, n-butyl methacrylate, sec-butyl methacrylate, tert-butyl methacrylate and the like, and methyl methacrylate is preferred among others.

Hydroxyalkyl acrylate and hydroxyalkyl methacrylate as used herein may be substituted or non-substituted ones and preferably include those having 2–4 carbon atoms in a hydroxyalkyl group, for example, 2-hydroxyethyl acrylate, 2-hydroxyethyl methacrylate, 2-hydroxypropyl acrylate, 2-hydroxyproply methacrylate, 3-hydroxypropyl acrylate, 3-hydroxypropyl methacrylate, 4-hydroxybutyl methacrylate, 2-hydroxy-3-chloropropyl acrylate, 2-hydroxy-3-chloropropyl methacrylate and the like.

In the general formula: $R_1COOH$ for representing organic acid (3), $R_1$ is a saturated or unsaturated hydrocarbon residue non-substituted or substituted with a hydroxyl group and having 5–20 carbon atoms and, preferably an aliphatic hydrocarbon residue, most preferably an aliphatic hydrocarbon residue having 5–17 carbon atoms. As the carbon number decreases to 4 or below or increases 21 or above, the transparency and/or mechanical strength of the resulting polymer composition are unsatisfactory and hinder the complete attainment of the objects of the present invention. Typical examples of the organic acid (3) include hexanoic acid, heptanoic acid, octanoic acid, nonanoic acid, decanoic acid, lauric acid, myristic acid, palmitic acid, stearic acid, arachidic acid, 2-hexenoic acid, 9-decenoic acid, linderic acid, lauroleic acid, myristoleic acid, palmitoleic acid, petroselinic acid, oleic acid, elaidic acid, linoleic acid, linolenic acid, sorbic acid, geranic acid, ricinoleic acid, ricinelaidic acid, naphthenic acid, octylbenzoic acid and the like.

In the general formula: $R_2COOH$ for representing organic acid (4) excluding acrylic and methacrylic acids, $R_2$ is a saturated or unsaturated hydrocarbon residue having 2–4 carbon atoms, preferably a saturated aliphatic hydrocarbon residue. Typical examples of the organic acid (4) include propionic acid, n-butyric acid, isobutyric acid, valeric acid, isovaleric acid, crotonic acid, tiglic acid, senecionic acid and the like. Generally, it is not necessary especially to use jointly $R_2COOH$ but the content of lead atom in a polymer can be increased by increasing the amount of $R_2COOH$, and a radiation shielding capacity of the polymer can be improved. On the contrary, such increase of the content decreases the mechanical property of the polymer, so the amount of $R_2COOH$ should be at most equal (by weight) to $R_1COOH$.

If the total amount of $R_1COOH$ and $R_2COOH$ to the raw material is less than 1.1% by weight the resulting polymer is not generally transparent but shows an opaque or opaque white, or heterogeneous appearance. On the other hand, excessive use of the $R_1COOH$ and $R_2COOH$ above a certain limit can provide no further improvement in the transparency over a certain level but rather reduces the mechanical strength and causes bleeding out of the polymeric material.

Further, if a ratio of the moles of the total organic acids including acrylic acid and/or methacrylic acid to the gram atoms of lead exceeds 4, it decreases the mechanical property of the resulting polymer, and if the ratio is low (generally less than 2), unreacted lead monoxide often remains or an insoluble lead compound often forms, so these insoluble compounds should be removed prior to polymerization and such procedure makes the operation troublesome.

In the preparation of the monomer composition in accordance with the present invention, with the amount of lead monoxide to the total weight of raw material to be used less than 6.5% by weight, the resulting polymer has no practical radiation shielding effect and, on the other hand, with above 57% by weight, it has no practical mechanical strength while the shielding effect is satisfactory. Preferably the amount of lead monoxide is 8–50% by weight.

Partial substitution of the above monomer (1) by other copolymerizable monomer to such an extent as to give no adverse effects to the objects of the present invention is also encompassed within the scope of the present invention. Such copolymerizable comonomers include, for example, methyl acrylate, ethyl acrylate, isopropyl acrylate, n-butyl acrylate, vinyl acetate, vinyl chloride, acrylonitrile, methacrylonitrile and the like.

The lead containing monomer composition in accordance with the present invention may be obtained by heating a mixture comprising the monomer (1), the monomer (2), the organic acid (3), lead monoxide and optionally the organic acid (4) at a temperature of between 10° C. and a boiling point of said mixture, preferably at 30° to 80° C. The method for addition and the order thereof are not limited.

Reaction mixture is initially an heterogeneous suspended system, but as the reaction proceeds lead monoxide dissolves and a clear reaction solution can be obtained. Water formed by the reaction is generally dissolved in the monomer composition, but when an amount of monomer (1) and the substituent monomer in the composition is small, a part of the water is often separated as a layer. Unless the water is separated as a layer, the reaction water need not necessarily be removed prior to polymerization. However, it often causes bubbles in the polymer, opacity, reduction of solvent resistance and the like, so it is necessarily removed by azeotropic distillation and the like after synthesis of the monomer composition when the occasion demands. In order to inhibit the polymerization during preparation of the monomer composition, it is generally preferable to use the least necessary amount of a conventional radical polymerization inhibitor such as hydroquinone, hydroquinone monomethylether, 2,4-dimethyl-6-tert-butyl phenol, etc.

The radiation shielding polymer in accordance with the present invention can be prepared by polymerizing the lead containing monomer composition obtained by the above mentioned method in the presence of a radical polymerization initiator in a mold or an extruder. The polymerization reaction is effected at a temperature usually between −10° C. and +150° C. and, preferably, 40° and 130° C. The initiator for radical polymerization is used, usually, in 0.001 to 5% and preferably, 0.02 to 1.0% by weight of the total monomer used. Typical examples of the initiator include lauroyl peroxide, tert-butyl peroxyisopropyl carbonate, benzoyl peroxide, dicumyl peroxide, tert-butyl peroxyacetate, tert-butyl peroxybenzoate, di-tert-butyl peroxide, 2,2'-azo-bis-isobutyronitrile and the like.

Further, other copolymerizable monomers, crosslinking agents, coloring agents such as dyes and pigments, antistatic agents, flame retarders, etc. may be added to the compositions when they are subjected to polymerization to such extent as to give no adverse results to the effect of the present invention.

This invention is to be described in details referring to the working examples and controls thereof.

EXAMPLES 1–14

The ingredients shown in Table 1 were mixed together and further 20 ppm of hydroquinone monomethylether and 80 ppm of 2,4-dimethyl-6-tert-butyl phenol were mixed with the mixture thus obtained as a polymerization inhibitor based on the polymerizable monomeric ingredients, and the reaction was carried out under stirring at a temperature of 60° C. for 2 hours to obtain a lead containing monomer composition.

EXAMPLES 15–17

The ingredients A shown in Table 2 were mixed together and the mixtures thus obtained were reacted respectively in the same procedures as in Example 1 to obtain lead containing monomer composition. The compositions were mixed with ingredients B shown in Table 2 as a copolymerizable monomer and were subjected to polymerization.

CONTROLS 1–3

A lead containing monomer composition were prepared from the ingredients shown in Table 1 and in the same procedure as in Example 1. Lead methacrylate in Control 1 was separately synthesized from lead monoxide and methacrylic acid and recrystallized from a mixed solution of water and methacrylic acid.

Table 1

| Example | Alkyl methacrylate | | Styrene (g) | Hydroxyalkyl (meth)acrylate (g) | | PbO (g) | (Meth)acrylic acid (g) | | Organic acid (g) | Other monomer (g) |
|---|---|---|---|---|---|---|---|---|---|---|
| 1 | MMA | 17 | 16 | HEMA | 17 | 46 | MA | 23 | Octanoic acid 25 | — |

Table 1-continued

| | | | | | | | | | | |
|---|---|---|---|---|---|---|---|---|---|---|
| 2 | MMA | 250 | 15 | — | | 33 | MA | 11 | Octanoic acid 28 | — |
| 3 | | — | 80 | — | | 20 | MA<br>AA | 7<br>5 | naphthenic<br>acid 17 | methyl acrylate<br>vinyl acetate |
| 4 | MMA | 200 | 16 | — | | 53 | MA | 21 | octanoic acid 20<br>propionic acid 10 | — |
| 5 | t-BMA | 5 | 30 | HCPMA | 65 | 63 | MA | 30 | octanoic acid 38 | — |
| 6 | MMA | 15 | 15 | HEMA<br>HPA | 10<br>10 | 33 | MA | 23 | linolenic acid 12 | — |
| 7 | MMA | 65 | — | HEA | 20 | 11 | MA | 7 | octanoic acid 3 | — |
| 8 | MMA | 5 | 5 | HEMA | 5 | 92 | MA<br>AA | 32<br>7 | octanoic acid 62 | — |
| 9 | MMA | 15 | 15 | HPA | 20 | 36 | MA | 24 | myristic acid 16 | — |
| 10 | MMA<br>EMA | 45<br>20 | — | HEMA | 20 | 10 | MA | 7 | stearic acid 4.5 | — |
| 11 | MMA | 76.5 | 9.5 | — | | 14.5 | MA | 6.5 | myristoleic acid 14.5 | — |
| 12 | MMA | 15 | 15 | HEMA | 20 | 40 | MA | 23.5 | hexanoic acid 11.5 | — |
| 13 | MMA | 76.5 | 9.5 | — | | 13.5 | MA | 6.5 | ricinolic acid 15.5 | — |
| 14 | MMA | 76.5 | 9.5 | — | | 16.5 | MA | 6.5 | octanoic acid 6<br>decanoic acid 7 | — |

| Control | Alkyl methacrylate (g) | | Styrene (g) | Hydroxyalkyl (meth)acrylate (g) | | PbO (g) | (Meth)acrylic acid(g) | | Organic acid (g) | Other monomer (g) |
|---|---|---|---|---|---|---|---|---|---|---|
| 1 | | — | — | — | | lead methacrylate 100 | | | — | — |
| 2 | MMA | 30 | 30 | HEMA | 10 | 17 | MA | 14 | — | — |
| 3 | MMA | 15 | 10 | HEMA | 15 | 40 | MA | 28 | octanoic acid 7 | — |

MMA is methyl methacrylate.
HEMA is 2-hydroxyethyl methacrylate.
HCPMA is 2-hydroxy-3-chloropropyl methacrylate.
HPA is 2-hydroxypropyl acrylate.
EMA is ethyl methacrylate.
HEA is 2-hydroxyethyl acrylate.
t-BMA is tert-butyl methacrylate.
MA is methacrylic acid.
AA is acrylic acid.
Octanoic acid is 2-ethyl hexanoic acid.

Table 2

| | Ingredients A | | | | Ingredients B | |
|---|---|---|---|---|---|---|
| Example | Methyl methacrylate(g) | Lead monoxide (g) | Methacrylic acid (g) | Organic Acid(g) | Styrene(g) | EM(23)(g) |
| 15 | 76.5 | 16 | 6 | octanoic acid 12 | 9.5 | — |
| 16 | 17 | 30 | 16 | octanoic acid 18 | 5.5 | 13 |
| 17 | 185 | 56 | 22 | octanoic acid 21<br>isobutyric acid 10 | 15 | — |

EM(23) is polyethyleneglycol dimethacrylate having 23 of ethylene oxide repeating unit.

EXAMPLES 18–34

To the monomer composition or the mixture of the monomer composition and the copolymerizable monomers obtained in Examples 1–17. lauroyl peroxide (hereinafter referred to as L) or tert-butyl peroxyisopropylcarbonate (hereinafter referred to as B) as a radical polymerization initiator was added to dissolve in the ratio 0.1 parts by weight of the initiator to 100 parts by weight of the total mixture as shown in Table 3. The liquid thus prepared was cast into a cell assembled with two glass plates and a vinyl chloride resin gasket and then subjected to polymerization in a nitrogen atmosphere at 80° C. for five hours and then at 120° C. for one hour. After the completion of the polymerization, the cell was disassembled to take out a transparent sheet having 8 mm of thickness. The properties of the cast sheets thus obtained are shown in Table 3.

CONTROLS 4–6

Sheets were prepared from the ingredients shown in Table 1 and in the same procedures as in Example 18. The properties of the cast sheets thus obtained are also shown in Table 3.

Table 3

| Example | Monomer composition | Polymerization initiator | Transparency | Total light transmittance*(%) | Dynstat impact strength**(kg-cm/cm$^2$) | Lead equivalent*** (mmPb) |
|---|---|---|---|---|---|---|
| 18 | Example 1 | L | Yes | 89 | 3.0 | 0.31 |
| 19 | Example 2 | L | Yes | 90 | 11.2 | 0.11 |
| 20 | Example 3 | L | Yes | 89 | 7.9 | 0.17 |
| 21 | Example 4 | L | Yes | 89 | 8.7 | 0.20 |
| 22 | Example 5 | B | Yes | 88 | 4.5 | 0.27 |
| 23 | Example 6 | L | Yes | 76 | 3.2 | 0.27 |
| 24 | Example 7 | L | Yes | 77 | 9.5 | 0.12 |
| 25 | Example 8 | B | Yes | 74 | 0.9 | 0.51 |
| 26 | Example 9 | B | Yes | 77 | 3.4 | 0.27 |
| 27 | Exmple 10 | B | Yes | 72 | 9.4 | 0.10 |
| 28 | Example 11 | B | Yes | 84 | 8.9 | 0.11 |
| 29 | Example 12 | B | Yes | 75 | 3.3 | 0.31 |
| 30 | Example 13 | B | Yes | 82 | 9.0 | 0.11 |

Table 3-continued

| Example | Monomer composition | Polymerization initiator | Transparency | Total light transmittance*(%) | Dynstat impact strength**(kg-cm/cm$^2$) | Lead equivalent*** (mmPb) |
|---|---|---|---|---|---|---|
| 31 | Example 14 | B | Yes | 83 | 9.1 | 0.12 |
| 32 | Example 15 | B | Yes | 85 | 9.1 | 0.13 |
| 33 | Example 16 | B | Yes | 75 | 22.3 | 0.30 |
| 34 | Example 17 | B | Yes | 73 | 8.6 | 0.21 |
| Control | | | | | | |
| 4 | Control 1 | L | Yes | — | <0.1 | 0.79 |
| 5 | Control 2 | B | No | 6 | 8.2 | 0.20 |
| 6 | Control 3 | L | No | 5 | 3.8 | 0.34 |

*Total light transmittance was measured according to ASTM D 1003.
**Dynstat impact strength was measured according to DIN 53453 (without notch).
***Lead equivalent represents the value for X-ray at the energy of 68.8keV.

What is claimed is:

1. A method for producing a lead containing monomer composition comprising reacting a mixture comprising (1) at least one monomer selected from the group consisting of alkyl methacrylate having 1–4 carbon atoms in an alkyl group, hydroxyalkyl acrylate, hydroxyalkyl methacrylate and styrene, (2) at least one monomer selected from the group consisting of acrylic acid and methacrylic acid, (3) at least one organic acid having the general formula: $R_1COOH$, wherein $R_1$ is a saturated or unsaturated hydrocarbon residue which is nonsubstituted or substituted with a hydroxyl group and having 5–20 carbon atoms and (4) an organic acid having the general formula: $R_2COOH$ excluding acrylic and methacrylic acids, wherein $R_2$ is a saturated or unsaturated hydrocarbon residue having 2–4 carbon atoms with lead monoxide, wherein (i) an amount of lead monoxide to total weight of a raw material to be used is 6.5–57% by weight, (ii) a ratio of total moles of the organic acids to gram atoms of lead is at most 4, (iii) an amount of said monomer (2) to the raw material is 3–45% by weight, a total amount of said organic acid (3) and said organic acid (4) to the raw material is 1.1–60% by weight and moles (A) of said monomer (2) and moles (B) of said organic acid (3) and said organic acid (4) to 100g of the raw material satisfy anyone of the following formulas I and II:

$$B>0.3A-0.04 \quad (I)$$

$$B>-0.7A+0.36 \quad (II)$$

and (iv) an amount of said organic acid (4) to the total amount of both organic acid (3) and organic acid (4) is 0–50% by weight.

2. A method according to claim 1, wherein the reaction is effected at a temperature between 10° C. and a boiling point of said mixture.

3. A method according to claim 2, wherein the reaction is effected at a temperature between 30° to 80° C.

4. A method according to claim 1, wherein the amount of lead monoxide is 8–50% by weight.

5. A method according to claim 1, wherein the ratio of total moles of the organic acids to gram atoms of lead is 2 to 4.

6. A method according to claim 1, wherein $R_1$ is a saturated or unsaturated aliphatic hydrocarbon residue non-substituted or substituted with a hydroxyl group and having 5–20 carbon atoms in the general formula: $R_1COOH$ for representing the organic acid (3).

7. A method according to claim 6, wherein $R_1$ is a saturated or unsaturated, non-substituted aliphatic hydrocarbon residue having 5–20 carbon atoms in the general formula: $R_1COOH$ for representing the organic acid (3).

8. A method according to claim 6, wherein $R_1$ is a saturated or unsaturated aliphatic hydrocarbon residue substituted with a hydroxyl group and having 5–20 carbon atoms in the general formula: $R_1COOH$ for representing the organic acid (3).

9. A method according to claim 7, wherein the organic acid (3) is a member selected from the group consisting of hexanoic acid, octanoic acid, decanoic acid, lauric acid, myristic acid, palmitic acid, stearic acid, myristoleic acid, palmitoleic acid, linoleic acid, linolenic acid, and naphthenic acid.

10. A method according to claim 8, wherein the organic acid (3) is ricinoleic acid.

11. A method according to claim 1, wherein the hydroxyalkyl acrylate or methacrylate has 2–4 carbon atoms in a hydroxyalkyl group.

12. A method according to claim 11, wherein the hydroxyalkyl acrylate or methacrylate is hydroxyethyl acrylate or methacrylate.

13. A method according to claim 1, wherein the alkyl methacrylate is methyl methacrylate.

14. A method according to claim 1, wherein $R_2$ is a saturated aliphatic hydrocarbon residue having 2–4 carbon atoms in the general formula: $R_2COOH$ for representing the organic acid (4).

15. A method for producing a radiation shielding polymer comprising polymerizing lead containing monomer composition produced by a method comprising reacting a mixture comprising (1) at least one monomer selected from the group consisting of alkyl methacrylate having 1–4 carbon atoms in an alkyl group, hydroxyalkyl acrylate, hydroxyalkyl methacrylate and styrene, (2) at least one monomer selected from the group consisting of acrylic acid and methacrylic acid, (3) at least one organic acid having the general formula: $R_1COOH$, wherein $R_1$ is a saturated or unsaturated hydrocarbon residue which is non-substituted or substituted with a hydroxyl group and having 5–20 carbon atoms and (4) an organic acid having the general formula: $R_2COOH$ excluding acrylic and methacrylic acids, wherein $R_2$ is a saturated or unsaturated hydrocarbon residue having 2–4 carbon atoms with lead monoxide, wherein (i) an amount of lead monoxide to total weight of a raw material to be used is 6.5–57% by weight, (ii) a ratio of total moles of the organic acids to gram atoms of lead is at most 4, (iii) an amount of said monomer (2) to the raw material is 3–45% by weight, a total amount of said organic acid (3) and said organic acid (4) to the raw material is 1.1–60% by weight and moles (A) of said monomer (2) and moles (B) of said organic acid (3) and said organic acid (4) to 100 g of the raw material satisfy anyone of the following formulas I and II:

$$B > 0.3A - 0.04 \quad (I)$$

$$B > -0.7A + 0.36 \quad (II)$$

and (iv) an amount of said organic acid (4) to the total amount of both organic acid (3) and organic acid (4) is 0–50% by weight.

16. A method according to claim 15, wherein the polymerization reaction is effected at a temperature between −10° C. and +150° C.

17. A method according to claim 16, wherein the polymerization reaction is effected at a temperature between 40° and 130° C.

18. A method according to claim 15, wherein the amount of lead monoxide is 8–50% by weight.

19. A method according to claim 15, wherein the ratio of total moles of the organic acids to gram atoms of lead is 2 to 4.

20. A method according to claim 15, wherein $R_1$ is a saturated or unsaturated aliphatic hydrocarbon residue nonsubstituted or substituted with a hydroxyl group and having 5–20 carbon atoms in the general formula: $R_1COOH$ for representing the organic acid (3).

21. A method according to claim 20, wherein $R_1$ is a saturated or unsaturated, non-substituted aliphatic hydrocarbon residue having 5–20 carbon atoms in the general formula: $R_1COOH$ for representing the organic acid (3).

22. A method according to claim 20, wherein $R_1$ is a saturated or unsaturated aliphatic hydrocarbon residue substituted with a hydroxyl group and having 5–20 carbon atoms in the general formula: $R_1COOH$ for representing the organic acid (3).

23. A method according to claim 21, wherein the organic acid (3) is a member selected from the group consisting of hexanoic acid, octanoic acid, decanoic acid, lauric acid, myristic acid, palmitic acid, stearic acid, myristoleic acid, palmitoleic acid, linoleic acid, linolenic acid and naphthenic acid.

24. A method according to claim 22, wherein the organic acid (3) is ricinoleic acid.

25. A method according to claim 15, wherein the hydroxyalkyl acrylate or methacrylate has 2–4 carbon atoms in a hydroxyalkyl group.

26. A method according to claim 25, wherein the hydroxyalkyl acrylate or methacrylate is hydroxyethyl acrylate or methacrylate.

27. A method according to claim 15, wherein the alkyl methacrylate is methyl methacrylate.

28. A method according to claim 15, wherein $R_2$ is a saturated aliphatic hydrocarbon residue having 2–4 carbon atoms in the general formula: $R_2COOH$ for representing the organic acid (4).

* * * * *

UNITED STATES PATENT OFFICE
CERTIFICATE OF CORRECTION

Patent No. 4,182,821 Dated January 8, 1980

Inventor(s) Haruo Nagai et al.

It is certified that error appears in the above-identified patent and that said Letters Patent are hereby corrected as shown below:

Col. 1, line 55; "4" should read -- is --
Col. 2, line 39; "2-hydroxyproply" should read -- 2-hydroxypropyl --
Col. 3, line 4; "$R_2COOH$ but" should read -- $R_2COOH$, but --
Table 1, the line after the words "Table 1" is left blank; it should read -- Ingredient --
Table 3, Col. 2, line 10; "Exmple 10" should read -- Example 10 --
Col. 7, Claim 1, line 2; "composition comprising" should read -- composition polymerizable into radiation-shielding polymer comprising --

Col. 7, Claim 1, line 8; "methacryclic" should read -- methacrylic --

Signed and Sealed this

*Twenty-ninth* Day of *July 1980*

[SEAL]

*Attest:*

SIDNEY A. DIAMOND

*Attesting Officer* *Commissioner of Patents and Trademarks*